United States Patent
Zhu et al.

(10) Patent No.: US 11,417,095 B2
(45) Date of Patent: Aug. 16, 2022

(54) IMAGE RECOGNITION METHOD AND APPARATUS, ELECTRONIC DEVICE, AND READABLE STORAGE MEDIUM USING AN UPDATE ON BODY EXTRACTION PARAMETER AND ALIGNMENT PARAMETER

(71) Applicant: TENCENT TECHNOLOGY (SHENZHEN) COMPANY LIMITED, Shenzhen (CN)

(72) Inventors: Xiaolong Zhu, Shenzhen (CN); Kaining Huang, Shenzhen (CN); Jingmin Luo, Shenzhen (CN); Lijian Mei, Shenzhen (CN); Shenghui Huang, Shenzhen (CN); Yongsen Zheng, Shenzhen (CN); Yitong Wang, Shenzhen (CN); Haozhi Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 135 days.

(21) Appl. No.: 16/685,526

(22) Filed: Nov. 15, 2019

(65) Prior Publication Data
US 2020/0089958 A1 Mar. 19, 2020

Related U.S. Application Data

(63) Continuation of application No. PCT/CN2018/120452, filed on Dec. 12, 2018.

(30) Foreign Application Priority Data

Dec. 14, 2017 (CN) .......................... 201711338566.5

(51) Int. Cl.
*G06V 20/40* (2022.01)
*G06K 9/62* (2022.01)
(Continued)

(52) U.S. Cl.
CPC ........... *G06V 20/40* (2022.01); *G06K 9/6201* (2013.01); *G06V 40/103* (2022.01); *G06V 40/23* (2022.01);
(Continued)

(58) Field of Classification Search
CPC .......... G06K 9/00711; G06K 9/00342; G06K 9/00348; G06K 9/00355; G06K 9/00362;
(Continued)

(56) References Cited

U.S. PATENT DOCUMENTS

2015/0193686 A1* 7/2015 Chakravarty .......... G06N 20/00
706/48
2019/0172223 A1* 6/2019 Vajda .................... G06K 9/4633

FOREIGN PATENT DOCUMENTS

CN 105787439 A 7/2016
CN 103824089 B 5/2017
(Continued)

OTHER PUBLICATIONS

Park et al. ("3D Human Pose Estimation Using Convolutional Neural Networks with 2D Pose Information" Nov. 2016, Springer, European Conference on Computer Vision, LNCS 9915, p. 156-169. (Year: 2016).*
(Continued)

*Primary Examiner* — Vincent Rudolph
*Assistant Examiner* — Timothy Choi
(74) *Attorney, Agent, or Firm* — Anova Law Group, PLLC (57) ABSTRACT

An image recognition method is provided. The method includes obtaining predicted locations of joints of a target
(Continued)

person in a to-be-recognized image based on a joint prediction model, where the joint prediction model is pre-constructed by: obtaining a plurality of sample images; inputting training features of the sample images and a body model feature to a neural network and obtaining predicted locations of joints in the sample images outputted by the neural network; updating a body extraction parameter and an alignment parameter; and inputting the training features of the sample images and the body model feature to the neural network to obtain the joint prediction model.

16 Claims, 6 Drawing Sheets

(51) Int. Cl.
*G06V 40/10* (2022.01)
*G06V 40/20* (2022.01)
*G06N 3/08* (2006.01)
*G06N 3/02* (2006.01)
*G06T 7/20* (2017.01)

(52) U.S. Cl.
CPC ............... *G06N 3/02* (2013.01); *G06N 3/08* (2013.01); *G06N 3/084* (2013.01); *G06T 7/20* (2013.01); *G06T 2207/30196* (2013.01); *G06V 20/44* (2022.01)

(58) Field of Classification Search
CPC ............ G06K 9/00369; G06K 9/6201; G06K 2009/00738; G06K 9/00; G06T 7/20; G06T 2207/30196; G06N 3/084; G06N 3/02; G06N 3/08; G06V 20/40; G06V 20/44; G06V 40/103; G06V 40/23; G06V 40/25
See application file for complete search history.

(56) References Cited

FOREIGN PATENT DOCUMENTS

| CN | 106650827 A | 5/2017 |
|---|---|---|
| CN | 107045725 A | 8/2017 |
| CN | 107220604 A | 9/2017 |
| CN | 107451568 A | 12/2017 |

OTHER PUBLICATIONS

Fu et al. "ORGM: Occlusion Relational Graphical Model for Human Pose Estimation", Feb. 2017, IEEE, Transactions on Image Processing, vol. 26, No. 2, p. 927-941. (Year: 2017).*

Martinez et al., "A simple yet effective baseline for 3d human pose estimation", Oct. 2017, IEEE, 2017 IEEE International Conference on Computer Vision (ICCV), p. 2659-2668. (Year: 2017).*

Mehta et al., "VNect: Real-time 3D Human Pose Estimation with a Single RGB Camera", Jul. 2017, ACM, ACM Transactions on Graphics, vol. 36, No. 4, art. 44, p. 44:1-44:14. (Year: 2017).*

Tekin et al., "Learning to Fuse 2D and 3D Image Cues for Monocular Body Pose Estimation", Oct. 2017, IEEE, 2017 IEEE International Conference on Computer Vision (ICCV), p. 3961-3970. (Year: 2017).*

The World Intellectual Property Organization (WIPO) International Search Report for PCT/CN2018/120452 dated Mar. 14, 2019 6 Pages (including translation).

The European Patent Office (EPO) The Extended European Search Report for 18888862.2 dated Jan. 12, 2021 10 Pages.

* cited by examiner

IMAGE RECOGNITION METHOD AND APPARATUS, ELECTRONIC DEVICE, AND READABLE STORAGE MEDIUM USING AN UPDATE ON BODY EXTRACTION PARAMETER AND ALIGNMENT PARAMETER

RELATED APPLICATIONS

This application claims priority to PCT Application No. PCT/CN2018/120452, filed on Dec. 12, 2018, which in turn claims priority to Chinese Patent Application No. 2017113385665, entitled "IMAGE RECOGNITION METHOD AND APPARATUS, ELECTRONIC DEVICE, AND READABLE STORAGE MEDIUM" filed with the China National Intellectual Property Administration on Dec. 14, 2017. Both applications are incorporated herein by reference in their entirety.

FIELD OF THE TECHNOLOGY

This application relates to the field of computer technologies, and more specifically, to an image recognition technology.

BACKGROUND OF THE DISCLOSURE

Body posture recognition has broad application prospects in applications such as interactive entertainment, intelligent video surveillance, patient monitoring systems, virtual reality, smart home, and the like. For example, when a user dances along with a dance video played by an electronic device, the electronic device may obtain body postures of the user based on obtained dance images of the user, to determine whether dance movements of the user are correct.

Often, a body posture recognition method is a joint recognition method. The key of the joint recognition method is to recognize a joint part (referred to as a joint) of a body. Currently, a common joint recognition method often attaches corresponding marking stickers to joint parts (referred to as joints) of the body, and determines locations of the joint parts of the body by recognizing the marking stickers. For example, a left knee is attached with a marking sticker of the left knee and a right knee is attached with a marking sticker of the right knee, so that the locations of the joints of the body are obtained by recognizing the marking stickers attached to the body.

The joint recognition method thus needs to recognize the locations of the joint parts of the body with the help of an external auxiliary device such as the marking stickers, which is inconvenient for the user to use and impairs user experience.

SUMMARY

In view of this, the present disclosure provides an image recognition method and apparatus, an electronic device, and a readable storage medium, to overcome the disadvantage of a joint recognition method in the related technology and determine locations of joint parts of a body without the help of an external auxiliary device, thereby improving user experience.

To achieve the foregoing objective, the present disclosure provides the following technical solutions.

One aspect of the present disclosure provides an image recognition method, applied to an electronic device. The method for image recognition includes the steps of obtaining a to-be-recognized feature of a to-be-recognized image, the to-be-recognized image comprising a target person; obtaining a preset body model feature of a body frame image, the body model feature comprising locations of joints in the body frame image; inputting the to-be-recognized feature and the body model feature to a pre-constructed joint prediction model, the joint prediction model being obtained through training a neural network by using minimum respective differences between real locations of joints in a sample image and predicted locations of the corresponding joints as a training objective; and obtaining predicted locations of joints of the target person in the to-be-recognized image based on the joint prediction model.

Another aspect of the present disclosure provides an image recognition apparatus. The apparatus includes a first obtaining module, configured to obtain a to-be-recognized feature of a to-be-recognized image, the to-be-recognized image comprising a target person; a second obtaining module, configured to obtain a preset body model feature of a body frame image, the body model feature comprising locations of joints in the body frame image; an input module, configured to input the to-be-recognized feature and the body model feature to a pre-constructed joint prediction model, the joint prediction model being obtained through training a neural network by using minimum respective differences between real locations of joints in a sample image and predicted locations of the corresponding joints as a training objective; and a predicted location obtaining module, configured to obtain predicted locations of joints of the target person in the to-be-recognized image based on the joint prediction model.

Another aspect of the present disclosure provides an electronic device. The device a memory, configured to store a program, and a processor configured to execute the program. The program is specifically configured to: obtain a to-be-recognized feature of a to-be-recognized image, the to-be-recognized image comprising a target person; obtain a preset body model feature of a body frame image, the body model feature comprising locations of joints in the body frame image; input the to-be-recognized feature and the body model feature to a pre-constructed joint prediction model, the joint prediction model being obtained through training a neural network by using minimum respective differences between real locations of joints in a sample image and predicted locations of the corresponding joints as a training objective; and obtain predicted locations of joints of the target person in the to-be-recognized image based on the joint prediction model.

Another aspect of the present disclosure provides a computer readable storage medium, storing a computer program, the computer program, when executed by a processor, implementing the operations of the image recognition method according to any one of the above.

It may be seen from the foregoing technical solutions that compared with the related technology, the embodiments of the present disclosure provide an image recognition method. A joint prediction model may be pre-constructed, and a to-be-recognized feature of a to-be-recognized image and a preset body model feature of a body frame image may be inputted to the joint prediction model. The joint prediction model is obtained through training a neural network by using minimum respective differences between real locations of joints and predicted locations in a training sample image of the corresponding joints as a training objective. The preset body model feature includes real locations of joints in the body frame image. Because structures of bodies are generally similar, the body model feature in the body frame image may be used as a comparison standard of locations of joints in the to-be-recognized image. Accordingly, predicted locations of joints of a target person in the to-be-recognized image are determined. Therefore, the locations of the joints of the target person in the to-be-recognized image that are predicted by the joint prediction model can be accurate. Further, in the foregoing process of predicting the locations of the joints, no external auxiliary device, such as a marking sticker, needs to be attached to the body, which is convenient for a user to use and improves user experience.

BRIEF DESCRIPTION OF THE DRAWINGS

To describe the technical solutions in the embodiments of the present disclosure or in the related technology more clearly, the following briefly describes the accompanying drawings required for describing the embodiments or the related technology. Apparently, the accompanying drawings in the following description show merely embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Obviously, the described embodiments are only some embodiments instead of all embodiments of the present disclosure. All other embodiments obtained by a person of ordinary skill in the art based on the embodiments of the present disclosure without creative efforts shall fall within the protection scope of the present disclosure.

Figure 1:
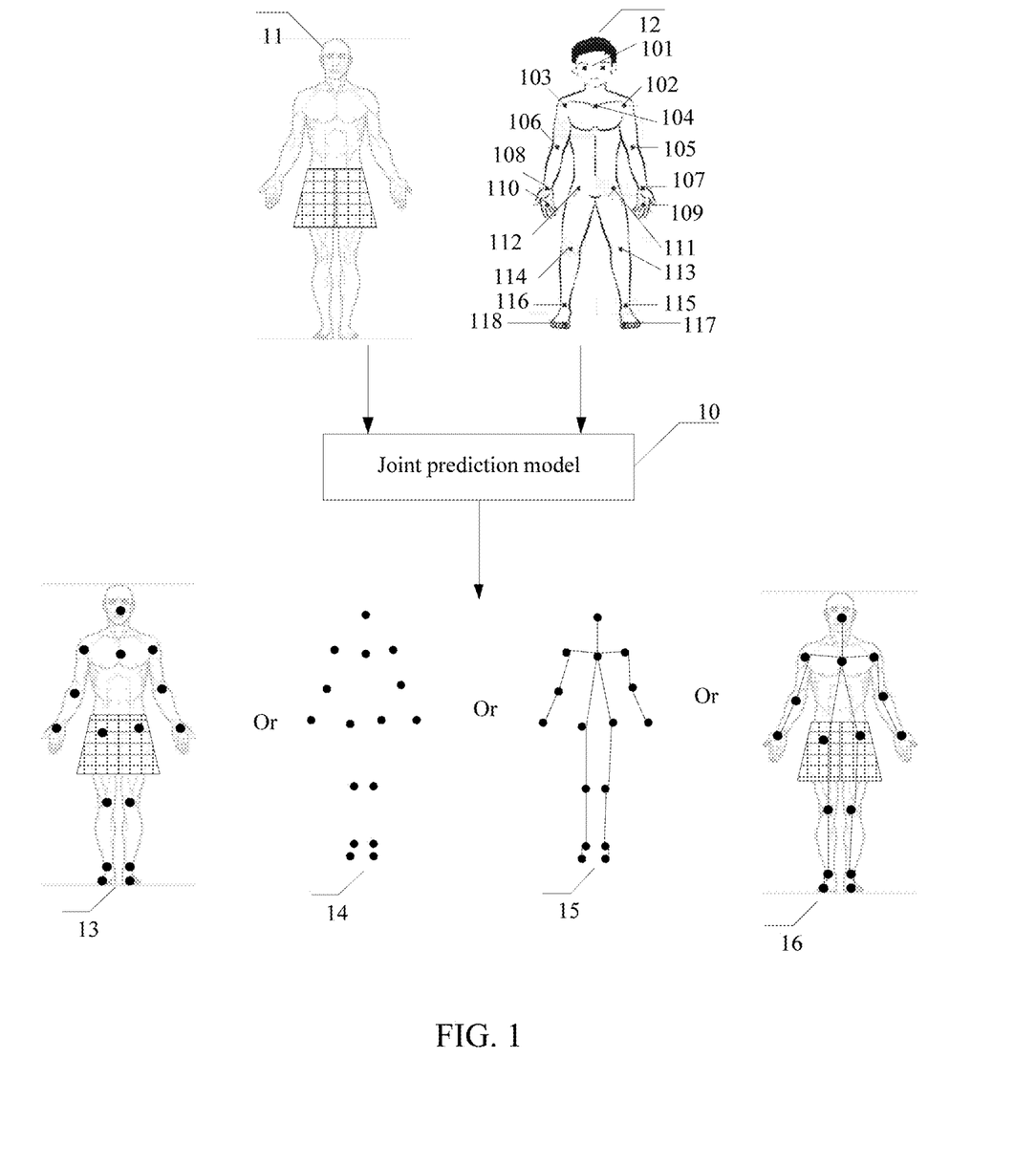
FIG. 1 is a schematic diagram of a process of an image recognition method according to an embodiment of the present disclosure.

FIG. 1 is a schematic diagram of a process of an image recognition method according to an embodiment of the present disclosure.

First, a joint prediction model 10, a to-be-recognized image 11, and a body frame image 12 in FIG. 1 are described respectively.

The joint prediction model 10 is pre-constructed. For example, the joint prediction model may be established through training a neural network by using a large quantity of sample images as training sample images of the neural network and using minimum respective differences between real locations of joints in the training sample images and predicted location of the corresponding joints as a training objective.

In some embodiments, the neural network may be a fully connected neural network (such as a multi-layer perceptron (MLP) network), or other forms of neural network (such as a convolutional neural network, a deep neural network, and the like).

In this embodiment of this application, the to-be-recognized image 11 includes a target person. If the to-be-recognized image 11 does not include a person, the joint prediction model should not output a predicted location of any joint.

A preset body model feature of the body frame image 12 includes locations of joints in the body frame image 12. In some embodiments, the quantity of the joints included in the body frame image 12 may be 18, respectively including: a head joint 101, a left shoulder joint 102, a right shoulder joint 103, a neck joint 104, a left elbow joint 105, a right elbow joint 106, a left wrist joint 107, a right wrist joint 108, a left palm joint 109, a right palm joint 110, a left pelvic joint 111, a right pelvic joint 112, a left knee joint 113, a right knee joint 114, a left ankle joint 115, a right ankle joint 116, a left toe joint 117, and a right toe joint 118.

In some embodiments, the quantity of the joints included in the body frame image 12 may be less than 18. For example, the body frame image 12 may include only 14 joints, that is, the head joint 101, the left shoulder joint 102, the right shoulder joint 103, the neck joint 104, the left elbow joint 105, the right elbow joint 106, the left wrist joint 107, the right wrist joint 108, the left pelvic joint 111, the right pelvic joint 112, the left knee joint 113, the right knee joint 114, the left ankle joint 115, and the right ankle joint 116.

In some embodiments, the quantity of the joints included in the body frame image 12 may be greater than 18. For example, the body frame image 12 may further include a nose joint, a left ear joint, a right ear joint, a left eye joint, a right eye joint, and the like. The quantity of the joints included in the body frame image 12 is not limited herein.

The image recognition method provided in this embodiment of this application is described in detail below with reference to FIG. 1.

A to-be-recognized feature of the to-be-recognized image 11 and the body model feature of the body frame image 12 are inputted to the joint prediction model 10. The joint prediction model 10 obtains predicted locations of joints of the target person in the to-be-recognized image 11 by performing corresponding data processing on the to-be-recognized feature and the body model feature inputted.

Specifically, the joint prediction model 10 may directly mark the corresponding predicted locations of the joints in the to-be-recognized image 11 (as shown in 13), or may generate a new image based on the predicted locations of the joints and mark the predicted locations of the joints in the new image (as shown in 14). The joint prediction model 10 may further output a body posture of the target person including the predicted locations of the joints. The body posture may be marked in a new image (as shown in 15), or may be marked in the to-be-recognized image 11 (as shown in 16).

Because structures of bodies are basically the same, the image recognition method provided in this embodiment of this application uses the body model feature as a comparison standard. That is, in a process of determining the predicted locations of the joints in the to-be-recognized image, the joint prediction model compares locations of joints in the body frame image with those of the target person in the to-be-recognized image, to determine the predicted locations of the joints of the target person. For example, the left shoulder joint in the body frame image is compared with a location area of the target person in the to-be-recognized image, to determine a location most likely to be the predicted location of the left shoulder joint in the location area. Because the embodiment of this application uses the body model feature of the body frame image as the comparison standard, the obtained predicted locations of the joints in the to-be-recognized image is accurate, and no external auxiliary device is required.

Figure 2:
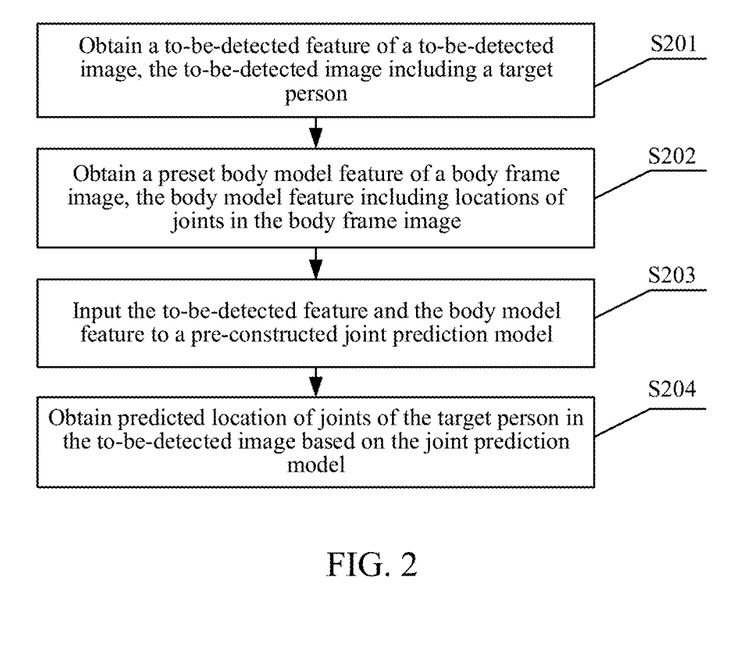
FIG. 2 is a flowchart of an image recognition method according to an embodiment of this application.

The image recognition method provided in this embodiment of this application is described below with reference to FIG. 2. It should be understood that, the image recognition method provided in this embodiment of this application is applied to an electronic device. The electronic device may be a terminal device, and may be specifically a smartphone, a computer, a personal digital assistant (PDA), a tablet computer, and the like. FIG. 2 is a flowchart of an image recognition method according to an embodiment of this application. The method includes the following steps:

Step S201: Obtain a to-be-recognized feature of a to-be-recognized image, the to-be-recognized image including a target person.

The to-be-recognized feature of the to-be-recognized image includes at least pixel values of pixels in the to-be-recognized image. The pixel value may include pixel values of color channels.

The color channels are a plurality of color channels of a color space. For example, the color channels may be an R channel, a G channel, and a B channel of an RGB color space; or an L channel, an A channel, and a B channel of an LAB color space; or an H channel, an S channel, and a V channel of an HSV color space; or an H channel, an S channel, and an I channel of an HIS color space; or a Y channel, an U channel, and a V channel of a YUV color space.

The to-be-recognized feature of the to-be-recognized image may be presented in a form of a matrix. The RGB color space is used as an example. Assuming that resolution of the to-be-recognized image is M1×N1, both M1 and N1 are positive integers, and a pixel value of a pixel in the $i^{th}$ row and the $j^{th}$ column in the to-be-recognized image is ($R_{ij}$, $G_{ij}$, $B_{ij}$), a matrix representation of the to-be-recognized feature of the to-be-recognized image is as follows:

$$\begin{bmatrix} (R_{1,1}, G_{1,1}, B_{1,1}) & \cdots & (R_{1,N1}, G_{1,N1}, B_{1,N1}) \\ \vdots & \ddots & \vdots \\ (R_{M1,1}, G_{M1,1}, B_{M1,1}) & \cdots & (R_{M1,N1}, G_{M1,N1}, B_{M1,N1}) \end{bmatrix}$$

Step S202: Obtain a preset body model feature of a body frame image, the body model feature including locations of joints in the body frame image.

In an optional embodiment, the body model feature of the body frame image may include where names of joints and locations corresponding to the names of the joints. In some embodiments, the body model feature may also be presented in a form of a matrix.

Assuming that the body frame image includes 10 joints, and the 10 joints respectively include: a head joint, a left shoulder joint, a right shoulder joint, a neck joint, a left wrist joint, a right wrist joint, a left pelvic joint, a right pelvic joint, a left ankle joint, and a right ankle joint. The 10 joints are identified by 101, 102, 103, 104, 107, 108, 111, 112, 115 and 116 respectively. Locations of the 10 joints in the body frame image are respectively as follows: the head joint (the a1$^{th}$ row and the b1$^{th}$ column), the left shoulder joint (the a2$^{th}$ row and the b2$^{th}$ column), the right shoulder joint (the a3$^{th}$ row and the b3$^{th}$ column), the neck joint (the a4$^{th}$ row and the b4$^{th}$ column), the left wrist joint (the a5$^{th}$ row and the b5$^{th}$ column), the right wrist joint (the a6$^{th}$ row and the b6$^{th}$ column), the left pelvic joint (the a7$^{th}$ row and the b7$^{th}$ column), the right pelvic joint (the a8$^{th}$ row and the b8$^{th}$ column), the left ankle joint (the a9$^{th}$ row and the b9$^{th}$ column), and the right ankle joint (the a10$^{th}$ row and the b10$^{th}$ column).

In some embodiments, according to the symmetrical structure of the body, a2 and a3 may be the same; a5 and a6 may be the same; a7 and a8 may be the same; and a9 and a10 may be the same. It may be understood that, most of the time, the left shoulder of the body is not as high as the right shoulder. Therefore, a2 and a3 may be different.

The body model feature may not only include the names of the joints and the locations of joints; but also may include locations (used as an example herein) of pixels in the body frame image. A matrix of the body model feature may be as follows:

$$\begin{bmatrix} \cdots & \cdots & \cdots & (101, a1, b1) & \cdots & \cdots & \cdots \\ \cdots & \cdots & \cdots & \cdots & \cdots & \cdots & \cdots \\ \cdots & (101, a3, b3) & \cdots & (101, a4, b4) & \cdots & (101, a2, b2) & \cdots \\ \cdots & \cdots & \cdots & \cdots & \cdots & \cdots & \cdots \\ \cdots & (101, a6, b6) & \cdots & \cdots & \cdots & (101, a5, b5) & \cdots \\ \cdots & \cdots & \cdots & \cdots & \cdots & \cdots & \cdots \\ \cdots & \cdots & (101, a8, b8) & \cdots & (101, a7, b7) & \cdots & \cdots \\ \cdots & \cdots & \cdots & \cdots & \cdots & \cdots & \cdots \\ \cdots & \cdots & (101, a10, b10) & \cdots & (101, a9, b9) & \cdots & \cdots \\ \cdots & \cdots & \cdots & \cdots & \cdots & \cdots & \cdots \end{bmatrix}$$

Ellipses in the foregoing matrix represent locations of pixels of non-joints.

In some embodiments, the location of each joint included in the body model feature of the body frame image may be a joint location area, or may be a specific location of the joint. Using the head joint as an example, in the foregoing matrix, each of 8 pixels neighboring a location (a1, b1) may be a joint location area of the head joint; and the location (a1, b1) is a specific location of the head joint.

Step S203: Input the to-be-recognized feature and the body model feature to a pre-constructed joint prediction model.

The joint prediction model is obtained through training a neural network by using minimum respective differences between real locations of joints in a sample image and predicted locations of the corresponding joints as a training objective.

The real locations of the joints in the sample image are known. The locations of the joints in the sample image that are predicted by the joint prediction model are the predicted locations. In a progress of training the joint prediction model, minimizing of a difference between a real location of each joint in the sample image and a predicted location of the joint is used as a training objective.

Because the joint prediction model is trained based on the foregoing training objective, the joint prediction model enables the predicted locations of the joints of the target person in the to-be-recognized image to approach accurate locations of the corresponding joints in the to-be-recognized image.

Step S204: Obtain predicted locations of joints of the target person in the to-be-recognized image based on the joint prediction model.

The joint prediction model may extract the target person from a background environment of the to-be-recognized image, so as to learn a location area of the target person in the to-be-recognized image. The body model feature includes the locations of the joints, and therefore may learn the location area of the person in the body frame image. Because structures of bodies are basically the same, the body model feature is used as a comparison standard. Predicted locations corresponding to the locations of the joints in the body model feature are found from the location area of the target person in the to-be-recognized image, and the predicted locations are the predicted locations of the joints of the target person in the to-be-recognized image.

cover various body postures reflected by the body as many as possible. Therefore, the joint prediction model obtained through training may predict the predicted locations of the joints in various to-be-recognized images (the to-be-recognized images in which the target person includes various body postures). In some embodiments, different weight ratios may be assigned to the data of joint locations for different postures. For example, for a sitting posture, there may be more movements in the lower body parts, the image recognition process may assign higher weight ratio to the lower body joint location data to obtain better image recognition results.

In some embodiments, scenes included in the plurality of negative sample images may cover scenes similar to the body as many as possible.

The sample image may be a color image, or may be a gray scale image.

2. Obtain training features of the sample images respectively.

In an optional embodiment, the training feature of the sample image at least includes pixel values of pixels in the sample image. The pixel value may include pixel values of color channels. The color channels are a plurality of color channels of a color space. For example, the color channels may be an R channel, a G channel, and a B channel of an RGB color space; or an L channel, an A channel, and a B channel of an LAB color space; or an H channel, an S channel, and a V channel of an HSV color space; or an H channel, an S channel, and an I channel of an HIS color space; or a Y channel, an U channel, and a V channel of a YUV color space.

In an optional embodiment, the training feature of the sample image may be presented in a form of a matrix. The RGB color space is used as an example. Assuming that resolution of the sample image is M1×N1, both M1 and N1 are positive integers, and a pixel value of a pixel in the $i^{th}$ row and the $j^{th}$ column in the sample image is ($R_{sample-ij}$, $G_{sample-ij}$, $B_{sample-ij}$), a matrix representation of the training feature of the sample image is as follows:

$$\begin{bmatrix} (R_{sample-1,1}, G_{sample-1,1}, B_{sample-1,1}) & \cdots & (R_{sample-1,N1}, G_{sample-1,N1}, B_{sample-1,N1}) \\ \vdots & \ddots & \vdots \\ (R_{sample-M1,1}, G_{sample-M1,1}, B_{sample-M1,1}) & \cdots & (R_{sample-M1,N1}, G_{sample-M1,N1}, B_{sample-M1,mN1}) \end{bmatrix}$$

Because the comparison standard is added to the body model feature, the accuracy of the predicted locations of the joints of the target person in the to-be-recognized image is greatly improved. In addition, in a progress of determining the predicted locations of the joints, the locations of the joints may be obtained without the help of an external auxiliary device, thereby being convenient for a user to use and greatly improving user experience.

Figure 3:
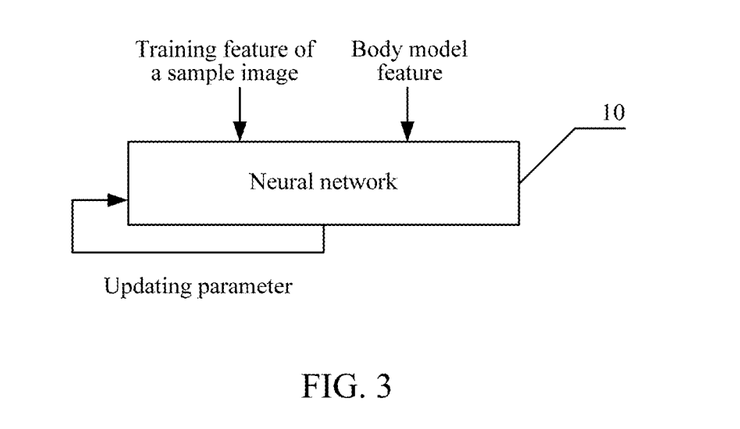
FIG. 3 is a schematic diagram of a process of constructing a joint prediction model according to an embodiment of this application.

The joint prediction model 10 shown in FIG. 1 is pre-constructed, and a process of constructing the joint prediction model is essentially a process of constantly updating the corresponding parameters. FIG. 3 is a schematic diagram of a process of constructing a joint prediction model according to an embodiment of this application.

1. Obtain a plurality of positive sample images and a plurality of negative sample images respectively, to obtain a plurality of sample images.

The positive sample image includes a person, and the negative sample image includes no person.

In some embodiments, body postures of the person corresponding to the plurality of positive sample images may If the sample image is a gray scale image, pixel values of pixels of the corresponding locations in component images of the color channels are equal. Using the RGB color space as an example, a pixel value $R_{sample-ij}$ of a pixel in the $i^{th}$ row and the $j^{th}$ column in an R component image of the R color channel, a pixel value $G_{sample-ij}$ of a pixel in the $i^{th}$ row and the $j^{th}$ column in a G component image of the G color channel, and a pixel value $B_{sample-ij}$ of a pixel in the $i^{th}$ row and the $j^{th}$ column in a B component image of the B color channel are equal.

3. Use the training features of the sample images and the body model feature as an input of the neural network, to obtain the joint prediction model through training.

Conventional image processing uses a manner of combining an artificial feature extraction and a support vector machine. The essence of the conventional image processing is still that a to-be-extracted feature is determined artificially and then recognized by the support vector machine. Due to a limitation of an artificially defined feature, the accuracy of the image processing is low.

However, the neural network may learn and extract features from large-scale sample images without artificially given features, and may find better abstract expression methods for images, thereby obtaining more better features. For example, semantic recognition may recognize a specific animal species included in an image. The neural network may obtain hundreds or even thousands of features from an image. Therefore, the neural network has high accuracy in the image processing.

The neural network may update parameters of the neural network by using a backpropagation gradient descent algorithm to implement iterative training and convergence of the neural network.

The parameters initially used by the neural network may be initialized random parameters. The neural network first processes the plurality of sample images based on the random parameters, and updates the parameters based on processing results. The neural network then processes the plurality of sample images based on the updated parameters, and updates the parameters again based on processing results. After a plurality of iterations, if the quantity of the iteration times is greater than a preset quantity of times, or the processing results satisfy a termination condition, the training is stopped, to obtain a final joint prediction model.

$$f_{M1 \times N1} = \begin{bmatrix} (R_{sample-1,1}, G_{sample-1,1}, B_{sample-1,1}) & \cdots & (R_{sample-1,N1}, G_{sample-1,N1}, B_{sample-1,N1}) \\ \vdots & \ddots & \vdots \\ (R_{sample-M1,1}, G_{sample-M1,1}, B_{sample-M1,1}) & \cdots & (R_{sample-M1,N1}, G_{sample-M1,N1}, B_{sample-M1,mN1}) \end{bmatrix};$$

The process of training the joint prediction model mainly involves a process of updating the parameters. In an optional embodiment, the joint prediction model mainly includes two types of parameters, that is, a person extraction parameter and an alignment parameter. The person extraction parameter is used to extract the person from a background environment in the image. The alignment parameter is used to represent respective correspondences between the predicted locations of the joints in the location area of the person in the image (the sample image or the to-be-recognized image) and the locations of joints in the body model feature. For example, the correspondence may be a correspondence between a location (may be a specific location, or a joint location area) of a head joint in the body model feature and a predicted location of the head joint in the location area of the person in the image (may be a specific location, or a predicted location area).

The updating process of the two types of parameters is described in detail below.

1. Input the training features of the sample images and the body model feature to the neural network.
2. Obtain predicted locations of joints included in sample images outputted by the neural network.

In some embodiments, the body extraction parameter and the alignment parameter in the neural network may initially be randomly set.

Figure 4:
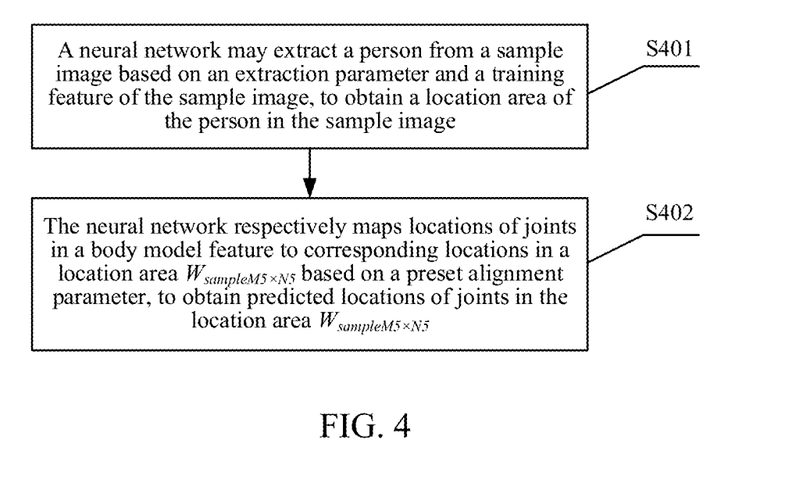
FIG. 4 is a flowchart of a neural network for obtaining predicted locations of joints included in a sample image according to an embodiment of this application.

In an optional embodiment, step 2 may include steps shown in FIG. 4.

Step S401: A neural network may extract a person from a sample image based on a person extraction parameter and a training feature of the sample image, to obtain a location area of the person in the sample image.

In some embodiments, the training feature of the sample image, the body extraction parameter, and the location area may be presented in a form of a matrix. In some embodiments, assuming that the training feature of the sample image is a matrix of M1×N1, the training feature of the sample image may be represented as a matrix $f_{M1 \times N1}$.

Assuming that the body extraction parameter is a matrix of M3×N3, the body extraction parameter may be represented as a matrix $P_{M3 \times N3}$. Assuming that the location area of the person in the sample image is a matrix of M5×N5, the location area of the person in the sample image may be represented as a matrix $W_{sample,M5 \times N5}$.

In some embodiments, there may be a plurality of body extraction parameters, and elements in the matrices of different body extraction parameters may be different.

It may be understood that the neural network may obtain different features (features used to distinguish the person from the background environment) based on the component images of different color channels. Therefore, to extract the person from the sample image more accurately, after the training feature $f_{M1 \times N1}$ of the sample image is inputted to the neural network, preferably, the neural network may first decompose the training feature of the sample image into image features of the component images corresponding to the color channels.

The RGB color space is used as an example. It is assumed that the training feature of the sample image is an image feature of the R component image of the R color channel is $$R\text{sample} = \begin{bmatrix} R_{sample-1,1} & \cdots & R_{sample-1,N1} \\ \vdots & \ddots & \vdots \\ R_{sample-M1,1} & \cdots & R_{sample-M1,N1} \end{bmatrix};$$

an image feature of the G component image of the G color channel is $$G\text{sample} = \begin{bmatrix} G_{sample-1,1} & \cdots & G_{sample-1,N1} \\ \vdots & \ddots & \vdots \\ G_{sample-M1,1} & \cdots & G_{sample-M1,N1} \end{bmatrix};$$

and an image feature of the B component image of the B color channel is $$B\text{sample} = \begin{bmatrix} B_{sample-1,1} & \cdots & B_{sample-1,N1} \\ \vdots & \ddots & \vdots \\ B_{sample-M1,1} & \cdots & B_{sample-M1,N1} \end{bmatrix}.$$

Operation (such as convolution operation) may be performed on $R_{sample}$ with a plurality of $P_{M3 \times N3}$s, to obtain a location area $W_{R-sample-M5 \times N5}$ of the person in the R component image. Operation (such as convolution operation) may be performed on $G_{sample}$ with the plurality of $P_{M3 \times N3}$s, to obtain a location area $W_{G-sample-M5 \times N5}$ of the person in the G component image. Operation (such as convolution operation) may be performed on $B_{sample}$ with the plurality of $P_{M3 \times N3}$s, to obtain a location area $W_{B-sample-M5 \times N5}$ of the person in the B component image.

Combine $W_{R-sample-M5 \times N5}$, $W_{G-sample-M5 \times N5}$, and $W_{B-sample-M5 \times N5}$, to obtain a location area $W_{sample-M5 \times N5}$ of the person in the sample image of the RGB color space.

In summary, component location areas of the person in the component images are obtained based on the image features corresponding to the component images in the sample image and the person extraction parameters corresponding to the component images. Further, the location area of the person in the sample image is obtained based on the component location areas.

In an optional embodiment, operation (such as convolution operation) may be directly performed on the training feature $f_{M1 \times N1}$ of the sample image with the plurality of body extraction parameters $P_{M3 \times N3}$, to obtain the location area $W_{sample-M5 \times N5}$.

The person extraction parameter may include at least: a person recognition parameter, and an extraction parameter that strips the person from the background environment of the image.

Step S402: The neural network respectively corresponds locations of joints in a body model feature to corresponding locations in a location area $W_{sample-M5 \times N5}$ based on a preset alignment parameter, to obtain predicted locations of joints in the location area $W_{sample-M5 \times N5}$.

In some embodiments, the body model feature and the alignment parameter may be presented in a form of a matrix. Assuming that the body model feature is a matrix of M2×N2, the body model feature may be represented as a matrix $H_{M2 \times N2}$. Assuming that the alignment parameter is a matrix of M4×N4, the alignment parameter may be represented as a matrix $R_{M4 \times N4}$.

Different joints may have a plurality of alignment parameters, and elements in the matrices of the alignment parameters of different joints may be different. Each joint corresponds to at least one alignment parameter.

Assuming that the locations of the joints or the matrix corresponding to the joint location area in the body model feature $H_{M2 \times N2}$ is $H_{(joint\ identifier)M2 \times N2}$ (including partial elements in $H_{M2 \times N2}$), for example, the location or the matrix corresponding to the location area of the head joint (identified by 101) is $H_{(101)M2 \times N2}$; and the alignment parameter corresponding to the joints is $R_{(joint\ identifier)M4 \times N4}$, still using the head joint as an example, the alignment parameter corresponding to the head joint is $R_{(101)M4 \times N4}$.

The predicted locations of the joints in the location area $W_{sample-M5 \times N5}$ are obtained based on $H_{(joint\ identifier)M2 \times N2}$ s, $R_{(joint\ identifier)M4 \times N4}$s, and $W_{sample-M5 \times N5}$. For example, the predicted location of the head joint in the location area $W_{sample-M5 \times N5}$ may be obtained based on $H_{(101)M2 \times N2}$, $R_{(101)M4 \times N4}$ and $W_{sample-M5 \times N5}$.

It may be understood that there are a variety of body postures, such as a sitting posture, a standing posture, a lying posture, a bending posture, and the like. Therefore, the posture of the person in the image (the sample image or the to-be-recognized image) may be a rotation of a preset angle of a partial or entire joint location of the body posture in the body frame image. The location area of the person in the image (the sample image or the to-be-recognized image) may be greater or less than the location area of the body in the body frame image. Therefore, the alignment parameter may further include a scaling parameter.

In summary, the alignment parameter may include at least the scaling parameter and a rotation parameter.

3. Obtain the predicted locations of the joints included in the sample images and compare the predicted locations with real locations of the joints included in the corresponding sample images respectively, to obtain comparison results.

4. Update the body extraction parameter and the alignment parameter based on the comparison results.

If the predicted location of the joint is in the background environment of the sample image, for example, the predicted location of the head joint is in the background environment, it indicates that the person extraction parameter is inaccurate, and the person extraction parameter is updated. If the predicted location of the joint is in the area of the person in the sample image, and is different from the real location of the joint, for example, the predicted location of the neck joint is in the area of the head joint in the sample image, it indicates that the alignment parameter may be inaccurate, that is, the alignment parameter may be updated.

In summary, the updating the body extraction parameter and the alignment parameter based on the comparison results includes: updating, in a case that the comparison result includes a first comparison result, the body extraction parameter based on the first comparison result; where the first comparison result includes a comparison result between a predicted location of a first joint in joints included in the sample image and a real location of the first joint; and the predicted location of the first joint is located in a background environment area of the corresponding sample image; and updating, in a case that the comparison result includes a second comparison result, the alignment parameter based on the second comparison result; where the second comparison result includes a comparison result between a predicted location of a second joint in joints included in the sample image and a real location of the second joint, the predicted location of the second joint is located in a location area of the person in the corresponding sample image, and the predicted location of the second joint is different from the real location of the second joint.

Steps 1 to 4 in this embodiment are performed again based on the updated body extraction parameter and alignment parameter. Then steps 1 to 4 in this embodiment are performed again based on the updated body extraction parameter and alignment parameter, and iterations are repeated until the comparison result satisfies a termination condition.

The termination condition may be that a difference between the predicted location and the real location of each joint is less than or equal to a preset value. If the termination condition is satisfied, it indicates that the trained neural network has reached a standard satisfying an actual application requirement. Therefore, the joint prediction model put into actual application may be constructed based on the parameters and structures of the neural network.

Figure 5A:
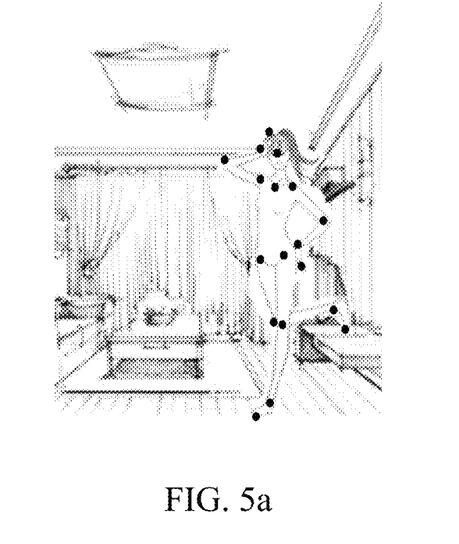
FIG. 5a is a schematic diagram of a real location area of a person and real locations of joints in a sample image according to an embodiment of this application.

To enable a person skilled in the art to better understand the training process of the joint prediction model, the following provides descriptions with reference to a specific example. FIG. 5a is a schematic diagram of a real location area of a person and real locations of joints in a sample image according to an embodiment of this application. This embodiment of this application is described by using 18 joints as an example.

Figure 5B:
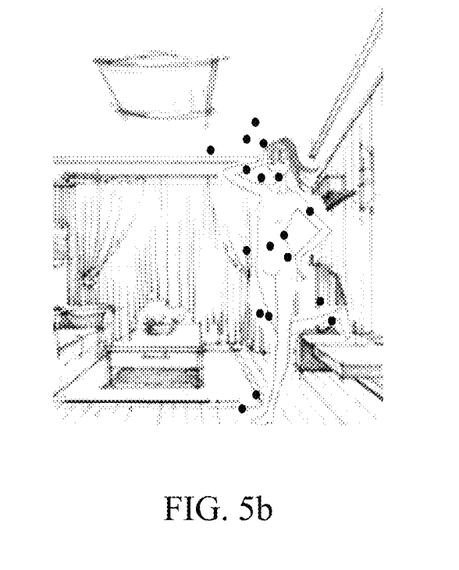
FIG. 5b is a schematic diagram of locations of joints in a sample image that are predicted by a neural network according to an embodiment of this application.
Figure 5C:
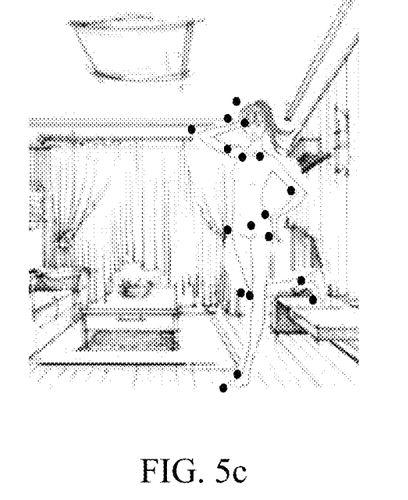
FIG. 5c is another schematic diagram of locations of joints in a sample image that are predicted by a neural network according to an embodiment of this application.
Figure 5D:
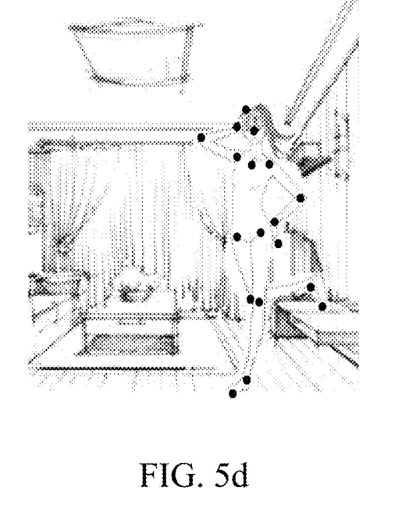
FIG. 5d is still another schematic diagram of locations of joints in a sample image that are predicted by a neural network according to an embodiment of this application.

FIG. 5b to FIG. 5d are schematic diagrams of locations of joints in a sample image that are predicted by a neural network as parameters are constantly updated according to an embodiment of this application.

During initial training of the joint prediction model, a person extraction parameter and an alignment parameter may be randomly set. Therefore, an initially obtained location area $W_{sample-M5 \times N5}$ of the person in the sample image may be inaccurate. Predicted locations of joints in the sample image that are obtained based on the inaccurate location area may also be inaccurate. It is assumed that predicted locations of joints in the sample image that are obtained in the first training process are shown in FIG. 5b.

Predicted location of the joints in the sample image that are obtained based on the updated person extraction parameter and alignment parameter in the second training process are shown in FIG. 5c.

It may be seen from FIG. 5b to FIG. 5c that, the predicted locations of the joints are more accurate than the predicted locations of the joints obtained in the first training.

After a plurality of training, it is assumed that the predicted locations of the joints in the sample image that are obtained in the V$^{th}$ training process are shown in FIG. 5d. V is a positive integer, and the value of V is generally large.

It may be seen from FIG. 5d that the predicted locations of the joints are very close to the real locations of joints. Therefore, the termination condition is satisfied, that is, the joint prediction model is obtained.

A process of obtaining predicted locations of joints in a to-be-recognized image by the joint prediction model is described with reference to the foregoing construction process of the joint prediction model.

1. A user inputs a to-be-recognized image or video to a corresponding application in an electronic device, such as a QQ application; or, the electronic device has a camera for acquiring a video or an image, and the electronic device itself acquires a to-be-recognized image or video.

The electronic device may directly obtain the to-be-recognized image inputted by the user, or may acquire the to-be-recognized image by itself. The electronic device may further obtain the to-be-recognized image from the video inputted by the user or the acquired video.

2. The electronic device obtains a to-be-recognized feature of the to-be-recognized image and a body model feature of a body frame image.

In some embodiments, the to-be-recognized feature of the to-be-recognized image may be presented in a form of a matrix. The to-be-recognized feature of the to-be-recognized image is of the same kind as the training feature of the sample image, and the dimension of the to-be-recognized feature of the to-be-recognized image may be the same as the dimension of the training feature of the sample image. Therefore, the to-be-recognized feature is a matrix of M1×N1, and the to-be-recognized feature of the to-be-recognized image may be represented as a matrix $Q_{M1 \times N1}$.

In some embodiments, the body model feature may be presented in a form of a matrix. Assuming that the body model feature is a matrix of M2×N2, the body model feature may be represented as $H_{M2 \times N2}$.

3. The electronic device inputs the to-be-recognized feature and the body model feature to a joint prediction model.

4. The joint prediction model in the electronic device obtains a location area of a target person in the to-be-recognized image based on a person extraction parameter and the to-be-recognized feature.

In a preferred embodiment, the joint prediction model divides the to-be-recognized feature $Q_{M1 \times N1}$ into image features of three color channels of a color space. Using an RGB color space as an example, the to-be-recognized feature $Q_{M1 \times N1}$ is divided into an image feature $Q_{R(M1 \times N1)}$ of an R color channel; an image feature $Q_{G(M1 \times N1)}$ of a G color channel; and an image feature $Q_{B(M1 \times N1)}$ of a B color channel.

It is assumed that $$Q_{M1 \times N1} = \begin{bmatrix} (R_{1,1}, G_{1,1}, B_{1,1}) & \cdots & (R_{1,N1}, G_{1,N1}, B_{1,N1}) \\ \vdots & \ddots & \vdots \\ (R_{M1,1}, G_{M1,1}, B_{M1,1}) & \cdots & (R_{M1,N1}, G_{M1,N1}, B_{M1,mN1}) \end{bmatrix},$$

-continued $$Q_{R(M1 \times N1)} = \begin{bmatrix} R_{1,1} & \cdots & R_{1,N1} \\ \vdots & \ddots & \vdots \\ R_{M1,1} & \cdots & R_{M1,N1} \end{bmatrix}; Q_{G(M1 \times N1)} = \begin{bmatrix} G_{1,1} & \cdots & G_{1,N1} \\ \vdots & \ddots & \vdots \\ G_{M1,1} & \cdots & G_{M1,N1} \end{bmatrix};$$

and $$Q_{B(M1 \times N1)} = \begin{bmatrix} B_{1,1} & \cdots & B_{1,N1} \\ \vdots & \ddots & \vdots \\ B_{M1,1} & \cdots & B_{M1,mN1} \end{bmatrix}.$$

If the to-be-recognized image is a gray scale image, pixel values of pixels of the corresponding locations in component images of the color channels are equal. Using the RGB color space as an example, a pixel value $Q_{Rij}$ of a pixel in the i$^{th}$ row and the j$^{th}$ column in an R component image of the R color channel, a pixel value $Q_{Gij}$ of a pixel in the i$^{th}$ row and the j$^{th}$ column in a G component image of the G color channel, and a pixel value $Q_{Bij}$ of a pixel in the i$^{th}$ row and the j$^{th}$ column in a B component image of the B color channel are equal.

Assuming that the body extraction parameter is a matrix of M3×N3, the body extraction parameter may be represented as a matrix $P_{M3 \times N3}$. In some embodiments, the dimensions of different body extraction parameters may be the same, but elements in the matrices are different. In this embodiment of this application, a plurality of body extraction parameters is represented as $P_{M3 \times N3}$; however, but elements in the matrices of different body extraction parameters may be different.

In some embodiments, the location area of the target person in the to-be-recognized image may be presented in a form of a matrix. Assuming that the location area of the target person in the to-be-recognized image is a matrix of M6×N6, the location area of the target person in the to-be-recognized image may be represented as $Z_{(M6 \times N6)}$.

Operations, such as convolution operation, may be performed on $Q_{R(M1 \times N1)}$ with one or more $P_{M3 \times N3}$s, to obtain a location area $Z_{R(M6 \times N6)}$ of a target person in the R component image from the R component image of the R color channel.

Operations, such as convolution operation may be performed on $Q_{G(M1 \times N1)}$ may each be operated with one or more $P_{M3 \times N3}$s, to obtain a location area $Z_{G(M6 \times N6)}$ of a target person in the G component image from the G component image of the G color channel.

Operations, such as convolution operation may be performed on $Q_{B(M1 \times N1)}$ with one or more $P_{M3 \times N3}$s, to obtain a location area $Z_{B(M6 \times N6)}$ of a target person in the B component image from the B component image of the B color channel.

$Z_{R(M6 \times N6)}$, $Z_{G(M6 \times N6)}$ and $Z_{B(M6 \times N6)}$, are combined to obtain a location area $Z_{(M6 \times N6)}$ of the target person in the to-be-recognized image in the RGB color space.

5. The joint prediction model in the electronic device respectively corresponds the locations of joints in the body model feature to the corresponding locations in the location area $Z_{(M6 \times N6)}$ based on an alignment parameter, to obtain the predicted locations of the joints in the location area $Z_{(M6 \times N6)}$.

In an optional embodiment, both the body model feature and the alignment parameter may be represented in a form of a matrix. Assuming that the body model feature is a matrix of M2×N2, the body model feature may be represented as a matrix $H_{M2 \times N2}$. Assuming that the alignment parameter is a matrix of M4×N4, the alignment parameter may be represented as a matrix $R_{M4 \times N4}$.

The alignment parameter is used to represent respective correspondences between the predicted locations of the joints in the location area $Z_{(M6 \times N6)}$ of the target person and the locations of the joints in the body model feature.

Each joint corresponds to at least one alignment parameter. The dimensions of different alignment parameters may be the same, but values of the elements included in the matrices may be different.

Operation is performed on the alignment parameter $R_{M4 \times N4}$, the body model feature $H_{M2 \times N2}$, and the location area $Z_{(M6 \times N6)}$ of the target person in the to-be-recognized image, to obtain the predicted locations of the joints in the location area $Z_{(M6 \times N6)}$.

Assuming that the locations of the joints or the matrix corresponding to the joint location area in the body model feature $H_{M2 \times N2}$ is $H_{(joint\ identifier)M2 \times N2}$ (including partial elements in $H_{M2 \times N2}$), for example, the location or the matrix corresponding to the location area of the head joint (identified by 101) is $H_{(101)M2 \times N2}$; and the alignment parameter corresponding to the joints is $R_{(joint\ identifier)M4 \times N4}$, still using the head joint as an example, the alignment parameter corresponding to the head joint is $R_{(101)M4 \times N4}$.

The predicted locations of the joints in the location area $Z_{(M6 \times N6)}$ are obtained based on $H_{(joint\ identifier)M2 \times N2}$s, $R_{(joint\ identifier)M4 \times N4}$s, and $Z_{(M6 \times N6)}$. For example, the predicted location of the head joint in the location area $Z_{(M6 \times N6)}$ may be obtained based on $H_{(101)M2 \times N2}$, $R_{(101)M4 \times N4}$ and $Z_{(M6 \times N6)}$.

Since the names and the predicted locations of the joints are known, the corresponding joints are connected. For example, a left shoulder joint, a left elbow joint, a left wrist joint, and a left palm joint are sequentially connected, to obtain a posture of a left arm. A right shoulder joint, a right elbow joint, a right wrist joint, and a right palm joint are sequentially connected, to obtain a posture of a right arm. A head joint, a neck joint, and a left pelvic joint are sequentially connected, and the head joint, the neck joint, and a right pelvic joint are sequentially connected. The left pelvic joint, a left knee joint, a left ankle joint, and a left toe joint are connected, to obtain a posture of a left leg. The right pelvic joint, a right knee joint, a right ankle joint, and a right toe joint are connected, to obtain a posture of a right leg. The entire body posture is formed through the connection of the corresponding joints.

In some embodiments, the neural network in this embodiment of this application may use a MobileNets network to obtain the joint prediction model through training.

MobileNets is a network transforming the conventional convolution structure into a two-layer convolution structure, and is implemented by using an operation like a group operation in ResNet. The new structure may greatly reduce the computation time and the quantity of the parameters basically without affecting the accuracy.

The core of the MobileNet network is to factorize an original standard convolution operation into a depth-wise convolution operation and a 1*1 (pointwise convolution) operation.

Body posture recognition may be applied to applications of interactive entertainment, intelligent video surveillance, patient monitoring systems, virtual reality, smart home, and the like.

The foregoing application scenario may need to perform a corresponding operation based on a body posture in an image. For example, if an image obtained by the smart home application includes a preset body posture, an operation of starting an air conditioner is performed. The foregoing application scenario may need to perform a corresponding operation based on the body postures respectively corresponding to a plurality of successive images. For example, in the patient monitoring system, whether a patient suddenly changes from a standing posture to a lying or kneeling posture may be learned by monitoring the body postures respectively corresponding to the plurality of successive images of the patient. If the standing posture is suddenly changed into the lying or kneeling posture, the condition of the patient is critical, and the patient monitoring system may give an alarm.

If the body postures respectively corresponding to the plurality of successive images are required, successive multi-frame video images may be obtained from the video, each frame of the video image is used as the to-be-recognized image respectively, and the steps of the image recognition method in this embodiment of this application are performed correspondingly, to obtain predicted locations of joints in each frame of the video image. Further, tracking information of the target person in the to-be-recognized image is obtained based on the predicted locations of the joints included in the successive multi-frame video images, so that the person is monitored.

The foregoing application scenario may also need to track the person. For example, in the intelligent video surveillance, if a suspect person is found, the person may be tracked based on the moving displacement (the moving displacement of the corresponding joints in the successive multi-frame video images) of the body postures in the successive multi-frame video images in the video.

In some embodiments, if the to-be-recognized image a one-frame video image in the video, anti-shake and smoothing processing may be performed on the video before and/or after the image recognition method provided in this embodiment of this application is performed. For example, in a user scenario within a shaky background (e.g., video recording on a subway train), an anti-shake and smoothing process may be applied to the joint location data before the image recognition method is applied, and then applied to the predicted locations of joints after the image recognition process. The image recognition system may automatically recognize whether a video is in a shaky environment based on the geographic location of the video recording data (e.g., location date indicating it is in a subway system), the quality of the video data, and the background in the video recorded. Therefore, by combining the anti-shake and smoothing processing with the image recognition process the predicted locations of the joints in the to-be-recognized image are more accurate, so that the body posture in the to-be-recognized image is more accurate.

In the image recognition method provided in this embodiment of this application, no external auxiliary device is required, thereby being more convenient for the user and making the applicable application scenario wider. Because the joint prediction model is obtained through training based on the neural network, the person may be accurately stripped from the background environment in the image based on the multidimensional feature without being affected by factors such as complex environment in the image, clothes changing of the person, light intensity of the image, and the like. The joint prediction model obtains the predicted locations of the joints in the image by using the body model feature in the body frame image as a standard comparison, thereby improving the accuracy of the predicted locations of the joints.

Figure 6:
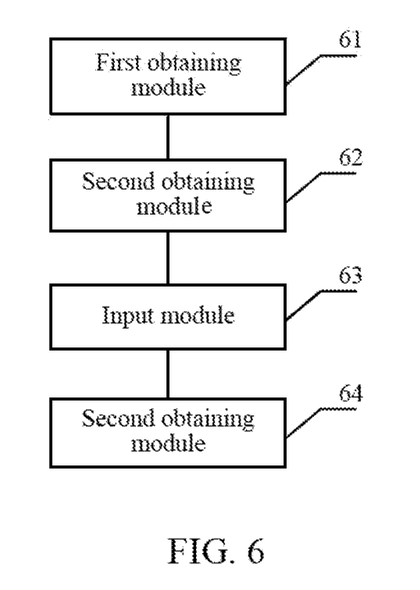
FIG. 6 is a structural diagram of an image recognition apparatus according to an embodiment of this application.

FIG. 6 is a structural diagram of an image recognition apparatus according to an embodiment of this application. The apparatus includes: a first obtaining module 61, configured to obtain a to-be-recognized feature of a to-berecognized image, the to-be-recognized image including a target person; a second obtaining module 62, configured to obtain a preset body model feature of a body frame image, the body model feature including locations of joints in the body frame image; an input module 63, configured to input the to-be-recognized feature and the body model feature to a pre-constructed joint prediction model, the joint prediction model being obtained through training a neural network by using minimum respective differences between real locations of joints in a sample image and a predicted location of the corresponding joints as a training objective; and a predicted location obtaining module 64, configured to obtain a predicted location of joints of the target person in the to-be-recognized image based on the joint prediction model.

In some embodiments, the image recognition apparatus further includes: a body posture obtaining module, configured to obtain a body posture of the target person in the to-be-recognized image outputted by the joint prediction model, the body posture including joints in the to-be-recognized image.

In some embodiments, the image recognition apparatus further includes: a third obtaining module, configured to obtain a plurality of positive sample images and a plurality of negative sample images respectively, to obtain a plurality of sample images, the positive sample image including a person, and the negative sample image including no person; a fourth obtaining module, configured to obtain training features of the sample images respectively; and a training module, configured to use the training features of the sample images and the body model feature as an input of the neural network, to obtain the joint prediction model through training.

In some embodiments, the training module in the image recognition apparatus specifically includes: an input unit, configured to input the training features of the sample images and the body model feature to the neural network; a first obtaining unit, configured to obtain predicted locations of joints included in sample images outputted by the neural network; a comparison unit, configured to compare the predicted locations of the joints included in the sample images with real locations of the joints included in the corresponding sample images respectively, to obtain comparison results; an updating unit, configured to update a body extraction parameter and an alignment parameter based on the comparison results, the body extraction parameter being used to extract the person from a background environment in the sample image; the alignment parameter being used to represent respective correspondences between locations of joints in the body model feature and the predicted location of the joints in the sample image; and a triggering unit configured to trigger the input unit in a case that the comparison results dissatisfy a termination condition and obtain the joint prediction model until the comparison result satisfies the termination condition.

In some embodiments, the updating unit specifically includes: a first updating subunit, configured to update, in a case that the comparison result includes a first comparison result, the body extraction parameter based on the first comparison result; where the first comparison result includes a comparison result between a predicted location of a first joint in joints included in the sample image and a real location of the first joint; and the predicted location of the first joint is located in a background environment area of the corresponding sample image; and a second updating subunit, configured to update, in a case that the comparison result includes a second comparison result, the alignment parameter based on the second comparison result; where the second comparison result includes a comparison result between a predicted location of a second joint in joints included in the sample image and a real location of the second joint, the predicted location of the second joint is located in a location area of the person in the corresponding sample image, and the predicted location of the second joint is different from the real location of the second joint.

In some embodiments, the image recognition apparatus further includes: a fifth obtaining module, configured to obtain successive multi-frame video images in a video and use each frame of the video image as the to-be-recognized image respectively, to obtain the to-be-recognized feature of the to-be-recognized image.

In some embodiments, the image recognition apparatus further includes: a sixth obtaining module, configured to obtain tracking information of the target person based on predicted locations of joints included in the multi-frame video images.

In the image recognition apparatus provided in this embodiment of this application, no external auxiliary device is required, thereby being more convenient for the user and making the applicable application scenario wider. Because the joint prediction model is obtained through training based on the neural network, the person may be accurately stripped from the background environment in the image based on the multidimensional feature without being affected by factors such as complex environment in the image, clothes changing of the person, light intensity of the image, and the like. The joint prediction model obtains the predicted locations of the joints in the image by using the body model feature in the body frame image as a standard comparison, thereby improving the accuracy of the predicted locations of the joint.

Figure 7:
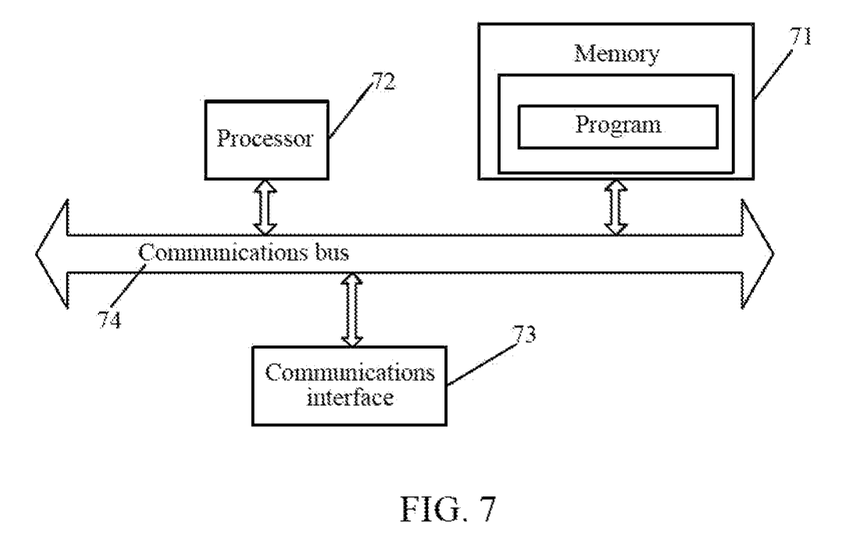
FIG. 7 is a structural diagram of an electronic device according to an embodiment of this application.

FIG. 7 is a structural diagram of an electronic device according to an embodiment of this application. The electronic device may be specifically a terminal device, including: a memory 71, configured to store a program, where the memory 71 may include a high-speed RAM memory, or may further include a non-volatile memory, for example, at least one magnetic disk memory; and a processor 72, configured to execute the program, the program being specifically configured to: obtain a to-be-recognized feature of a to-be-recognized image, the to-be-recognized image including a target person; obtain a preset body model feature of a body frame image, the body model feature including locations of joints in the body frame image; input the to-be-recognized feature and the body model feature to a pre-constructed joint prediction model, the joint prediction model being obtained through training a neural network by using minimum respective differences between real locations of joints in a sample image and predicted location of the corresponding joints as a training objective; and obtain predicted location of joints of the target person in the to-be-recognized image based on the joint prediction model.

The processor 72 may be a central processing unit (CPU) or an application-specific integrated circuit (ASIC), or may be configured as one or more integrated circuits for implementing the embodiments of the present disclosure.

The electronic device may further include a communications interface 73 and a communications bus 74. The memory 71, the processor 72, and the communications interface 73 communicate with each other by using the communications bus 74.

In some embodiments, the communications interface may be an interface of a communications module, for example, an interface of a GSM module.

In some embodiments, the processor 72 is further configured to: obtain a body posture of the target person in the to-be-recognized image outputted by the joint prediction model, the body posture including joints in the to-be-recognized image.

In some embodiments, when performing the construction method for obtaining the joint prediction model, the processor is specifically configured to: obtain a plurality of positive sample images and a plurality of negative sample images respectively, to obtain a plurality of sample images, the positive sample image including a person, and the negative sample image including no person; obtain training features of the sample images respectively; and use the training features of the sample images and the body model feature as an input of the neural network, to obtain the joint prediction model through training.

In some embodiments, when using the training features of the sample images and the body model feature as an input of the neural network, to obtain the joint prediction model through training, the processor is specifically configured to: input the training features of the sample images and the body model feature to the neural network; obtain predicted locations of joints included in sample images outputted by the neural network; compare the predicted locations of the joints included in the sample images with real locations of the joints included in the corresponding sample images respectively, to obtain comparison results; update a body extraction parameter and an alignment parameter based on the comparison result, the body extraction parameter being used to extract the person from a background environment in the sample image and the alignment parameter being used to represent respective correspondences between locations of joints in the body model feature and the predicted locations of the joints in the sample image; and return the operation of inputting the training features of the sample images and the body model feature to the neural network, until the comparison result satisfies a termination condition, to obtain the joint prediction model.

In some embodiments, when updating a body extraction parameter and an alignment parameter based on the comparison results, the processor is specifically configured to: update, in a case that the comparison result includes a first comparison result, the body extraction parameter based on the first comparison result; where the first comparison result includes a comparison result between a predicted location of a first joint in joints included in the sample image and a real location of the first joint; and the predicted location of the first joint is located in a background environment area of the corresponding sample image; and update, in a case that the comparison result includes a second comparison result, the alignment parameter based on the second comparison result; where the second comparison result includes a comparison result between a predicted location of a second joint in joints included in the sample image and a real location of the second joint, the predicted location of the second joint is located in a location area of the person in the corresponding sample image, and the predicted location of the second joint is different from the real location of the second joint.

In some embodiments, when obtaining the to-be-recognized feature of the to-be-recognized image, the processor is specifically configured to obtain successive multi-frame video images in a video and use each frame of the video image as the to-be-recognized image respectively, to obtain the to-be-recognized feature of the to-be-recognized image.

In some embodiments, the processor is further configured to obtain tracking information of the target person based on predicted locations of joints included in the multi-frame video images.

This embodiment of the present disclosure further provides a readable storage medium, storing a computer program, the computer program, when executed by a processor, implementing the operations of the image recognition method according to any one of the foregoing embodiments.

This embodiment of the present disclosure further provides a computer program product including instruction, the instructions, when run in a computer, causing the computer to perform the operations of the image recognition method according to any one of the foregoing embodiments.

At last, the relational terms herein such as first and second are used only to differentiate an entity or operation from another entity or operation, and do not require or imply any actual relationship or sequence between these entities or operations. Moreover, the terms "include", "comprise", and any variants thereof are intended to cover a non-exclusive inclusion. Therefore, in the context of a process, a method, an object, or a device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, the method, the article, or the device that includes the element.

The embodiments in this specification are all described in a progressive manner. Description of each of the embodiments focuses on differences from other embodiments, and reference may be made to each other for the same or similar parts among respective embodiments.

The above descriptions of the disclosed embodiments make a person skilled in the art implement or use this application. Various modifications to these embodiments are obvious to a person skilled in the art, and the general principles defined in this specification may be implemented in other embodiments without departing from the spirit and scope of this application. Therefore, this application is not limited to these embodiments illustrated in this specification, but needs to conform to the broadest scope consistent with the principles and novel features disclosed in this specification.

What is claimed is:

1. An image recognition method, applied to an electronic device, and comprising:
    obtaining a to-be-recognized feature of a to-be-recognized image, the to-be-recognized image comprising a target person;
    obtaining a preset body model feature of a body frame image, the preset body model feature comprising locations of joints in the body frame image;
    inputting the to-be-recognized feature and the preset body model feature to a pre-constructed joint prediction model, the joint prediction model is pre-constructed by:
        obtaining a plurality of positive sample images and a plurality of negative sample images respectively, to obtain a plurality of sample images, the positive sample image comprising a person, and the negative sample image comprising no person;
        obtaining training features of the sample images respectively;
        inputting the training features of the sample images and the preset body model feature to a neural network and obtaining predicted locations of joints in the sample images outputted by the neural network;
comparing the predicted locations of the joints with real locations of the joints respectively, to obtain comparison results;
updating a body extraction parameter and an alignment parameter based on the comparison results, the body extraction parameter being used to extract the person from a background environment in the sample images and the alignment parameter being used to represent respective correspondences between locations of joints in the preset body model feature and the predicted locations of the joints in the sample images;
in response to determining the plurality of positive sample images reflects a sitting posture, assigning a higher weight ratio to lower body joint location data than to upper body joint location data; and
inputting the training features of the sample images and the preset body model feature to the neural network to obtain the joint prediction model; and
obtaining predicted locations of joints of the target person in the to-be-recognized image based on the joint prediction model.

2. The image recognition method according to claim 1, further comprising:
obtaining a body posture of the target person in the to-be-recognized image outputted by the joint prediction model, the body posture comprising the predicted locations of joints of the target person in the to-be-recognized image.

3. The image recognition method according to claim 1, wherein updating the body extraction parameter and the alignment parameter comprises:
updating the body extraction parameter in response to determining any of the predicted locations of the joints is located in a background environment area of the sample images; and
updating the alignment parameter in response to determining any of the predicted locations of the joints is different from its corresponding real location.

4. The image recognition method according to claim 1, wherein obtaining the to-be-recognized feature comprises:
obtaining multi-frame video images in a video and using a frame of the video image as the to-be-recognized image, to obtain the to-be-recognized feature of the to-be-recognized image.

5. The image recognition method according to claim 4, further comprising:
obtaining tracking information of the target person based on the predicted locations of joints in the multi-frame video images.

6. The image recognition method according to claim 1, wherein the to-be-recognized feature includes pixel values of color channels.

7. The image recognition method according to claim 1, wherein a resolution of the to-be-recognized image is M1×N1, both M1 and N1 are positive integers, and a pixel value of a pixel in the $i^{th}$ row and the $j^{th}$ column in the to-be-recognized image is $(R_{ij}, G_{ij}, B_{ij})$, a matrix representation of the to-be-recognized feature of the to-be-recognized image is:

$$\begin{bmatrix} (R_{1,1}, G_{1,1}, B_{1,1}) & \cdots & (R_{1,N1}, G_{1,N1}, B_{1,N1}) \\ \vdots & \ddots & \vdots \\ (R_{M1,1}, G_{M1,1}, B_{M1,1}) & \cdots & (R_{M1,N1}, G_{M1,N1}, B_{M1,N1}) \end{bmatrix}.$$

8. The image recognition method according to claim 1, wherein the alignment parameter includes a rotation parameter and a scaling parameter, wherein the rotation parameter corresponds to a rotation of a preset angle of joint location in the body frame image, and wherein the alignment parameter corresponds to a difference between a location area in the sample images and a location area in the body frame image.

9. The image recognition method according to claim 1, wherein the locations of joints of the body model feature of the body image frame are presented in a matrix, wherein the matrix includes a first location, a second location, and a third location, wherein the first location includes one or more first joints, the second location includes one or more second joints different than the one or more first joints, and the third location includes one or more non-joints.

10. An image recognition apparatus, comprising: a memory storing computer program instructions; and a processor coupled to the memory and configured to execute the computer program instructions and perform:
obtaining a to-be-recognized feature of a to-be-recognized image, the to-be-recognized image comprising a target person;
obtaining a preset body model feature of a body frame image, the preset body model feature comprising locations of joints in the body frame image;
inputting the to-be-recognized feature and the preset body model feature to a pre-constructed joint prediction model, the joint prediction model is pre-constructed by:
obtaining a plurality of positive sample images and a plurality of negative sample images respectively, to obtain a plurality of sample images, the positive sample image comprising a person, and the negative sample image comprising no person;
obtaining training features of the sample images respectively;
inputting the training features of the sample images and the preset body model feature to a neural network and obtaining predicted locations of joints in the sample images outputted by the neural network;
comparing the predicted locations of the joints with real locations of the joints respectively, to obtain comparison results;
updating a body extraction parameter and an alignment parameter based on the comparison results, the body extraction parameter being used to extract the person from a background environment in the sample images and the alignment parameter being used to represent respective correspondences between locations of joints in the preset body model feature and the predicted locations of the joints in the sample images;
in response to determining the plurality of positive sample images reflects a sitting posture, assigning a higher weight ratio to lower body joint location data than to upper body joint location data; and
inputting the training features of the sample images and the preset body model feature to the neural network to obtain the joint prediction model; and
obtaining predicted locations of joints of the target person in the to-be-recognized image based on the joint prediction model.

11. The image recognition apparatus according to claim 10, wherein the processor is further configured to execute the computer program instructions to perform:

obtaining multi-frame video images in a video and using a frame of the video image as the to-be-recognized image, to obtain the to-be-recognized feature of the to-be-recognized image.

12. A non-transitory computer readable storage medium, storing a computer program, the computer program, when executed by a processor, implementing the operations of the image recognition method comprising:

obtaining a to-be-recognized feature of a to-be-recognized image, the to-be-recognized image comprising a target person;

obtaining a preset body model feature of a body frame image, the preset body model feature comprising locations of joints in the body frame image;

inputting the to-be-recognized feature and the preset body model feature to a pre-constructed joint prediction model, the joint prediction model is pre-constructed by:

obtaining a plurality of positive sample images and a plurality of negative sample images respectively, to obtain a plurality of sample images, the positive sample image comprising a person, and the negative sample image comprising no person;

obtaining training features of the sample images respectively;

inputting the training features of the sample images and the preset body model feature to a neural network and obtaining predicted locations of joints in the sample images outputted by the neural network;

comparing the predicted locations of the joints with real locations of the joints respectively, to obtain comparison results;

updating a body extraction parameter and an alignment parameter based on the comparison results, the body extraction parameter being used to extract the person from a background environment in the sample images and the alignment parameter being used to represent respective correspondences between locations of joints in the preset body model feature and the predicted locations of the joints in the sample images;

in response to determining the plurality of positive sample images reflects a sitting posture, assigning a higher weight ratio to lower body joint location data than to upper body joint location data; and inputting the training features of the sample images and the preset body model feature to the neural network to obtain the joint prediction model; and obtaining predicted locations of joints of the target person in the to-be-recognized image based on the joint prediction model.

13. The computer readable storage medium according to claim 12, the method further comprising:

obtaining a body posture of the target person in the to-be-recognized image outputted by the joint prediction model, the body posture comprising the predicted locations of joints of the target person in the to-be-recognized image.

14. The computer readable storage medium according to claim 12, wherein the updating the body extraction parameter and the alignment parameter comprises:

updating the body extraction parameter in response to determining any of the predicted locations of the joints is located in a background environment area of the sample images; and updating the alignment parameter in response to determining any of the predicted locations of the joints is different from its corresponding real location.

15. The computer readable storage medium according to claim 14, wherein the obtaining the to-be-recognized feature comprises:

obtaining multi-frame video images in a video and using a frame of the video image as the to-be-recognized image, to obtain the to-be-recognized feature of the to-be-recognized image.

16. The computer readable storage medium according to claim 15, the method further comprising:

obtaining tracking information of the target person based on the predicted locations of joints in the multi-frame video images.

* * * * *